(12) United States Patent
Chou et al.

(10) Patent No.: US 6,666,911 B2
(45) Date of Patent: Dec. 23, 2003

(54) TREATMENT SYSTEM FOR WASTE GAS CONTAINING VOLATILE ORGANIC COMPOUNDS

(75) Inventors: Ming-Shean Chou, Chiayi (TW); Peter A. Quigley, Pocasset, MA (US); Stephen C. Nolet, Franklin, MA (US); Thomas W. Wideman, Milton, MA (US)

(73) Assignee: Zhong Huan Environment Advisor Corp. (TW)

( * ) Notice: Subject to any disclaimer, the term of this patent is extended or adjusted under 35 U.S.C. 154(b) by 0 days.

(21) Appl. No.: 10/194,893

(22) Filed: Jul. 11, 2002

(65) Prior Publication Data

US 2003/0070549 A1 Apr. 17, 2003

(30) Foreign Application Priority Data

Oct. 16, 2001 (TW) ........................................ 90125737 A

(51) Int. Cl.[7] ............................................... B01D 53/06
(52) U.S. Cl. ............................. 96/125; 96/123; 96/128; 96/130; 96/146; 96/150
(58) Field of Search .......................... 96/123, 125–128, 96/130, 143, 144, 150

(56) References Cited

U.S. PATENT DOCUMENTS

| | | | | |
|---|---|---|---|---|
| 3,455,089 A | * | 7/1969 | Mattia | 95/141 |
| 4,348,362 A | * | 9/1982 | Foss | 422/171 |
| 4,409,006 A | * | 10/1983 | Mattia | 95/113 |
| 4,775,484 A | * | 10/1988 | Schmidt et al. | 210/673 |
| 4,869,734 A | * | 9/1989 | Jacquish | 95/111 |
| 4,946,479 A | * | 8/1990 | Izumo | 96/123 |
| 4,966,611 A | * | 10/1990 | Schumacher et al. | 95/18 |
| 4,986,836 A | * | 1/1991 | Tandon | 96/111 |
| 4,995,890 A | * | 2/1991 | Croudace | 96/111 |
| 5,567,229 A | * | 10/1996 | Klobucar et al. | 95/113 |
| 5,701,762 A | * | 12/1997 | Akamatsu et al. | 62/636 |
| 5,908,490 A | * | 6/1999 | Akamatsu et al. | 95/113 |
| 6,080,227 A | * | 6/2000 | Kurosawa et al. | 96/111 |
| 6,364,943 B1 | * | 4/2002 | Maekawa | 96/123 |
| 6,372,018 B1 | * | 4/2002 | Cowles | 95/18 |

* cited by examiner

*Primary Examiner*—Robert H. Spitzer
(74) *Attorney, Agent, or Firm*—Dellett & Walters

(57) ABSTRACT

A treatment system for waste gas containing VOCs is composed of a zeolite revolver (10), an incinerator (20) and a network of pipes, valves and filters. The zeolite revolver (10) consists of an adsorption zone (11), a purge zone (12), and a desorption zone (13) to remove VOCs from untreated waste gas in the adsorption zone (11) and then separate the VOCs from the saturated zeolite in the desorption zone (13). The zeolite is cooled down in the purge zone (12) so it can be used again. The separated VOCs are piped into the incinerator (20) to be used as fuel. Whereby, the treatment system for waste gas containing VOCs operates efficiently and economically.

20 Claims, 10 Drawing Sheets

TREATMENT SYSTEM FOR WASTE GAS CONTAINING VOLATILE ORGANIC COMPOUNDS

BACKGROUND OF THE INVENTION

1. Field of the Invention

The present invention relates to a treatment system for waste gas containing volatile organic compounds (VOCs), and more specifically to a system which uses a zeolite revolver to absorb the VOCs and reuses recycled VOCs as fuel to lower operating cost and increase operated efficiency of this system.

2. Description of Related Art

Many chemical industries such as refining oil, petrochemistry, artificial leather making, adhesive tape making, paint making, coating, semiconductor producing, etc. produce waste gas that contains VOCs to cause serious air pollution.

Various conventional systems for cleaning air commonly use an incinerating system to decompose the VOCs directly to make the released VOC environmental standards. Incinerating methods basically include direct incineration and incineration using catalyst. Most incinerating systems recycle heat by recuperative heat recovery but less than 70% rate of the heat is recycled. Additionally, other incinerating systems, such as regenerative thermal oxidizer (RTO) and regenerative catalytic oxidizer (RCO) systems, use regenerative heat recovery to recycle heat and recycled more than 90% of the heat. However, no matter which incinerating system described above is, the concentration of VOCs in all of the foregoing incineration systems is not adequate to completely fuel the process, and extra fuel or electrothermal energy has to be added to the incinerating system. Therefore, the operating cost of the conventional incinerating systems is extremely high.

Therefore, the present invention mitigates and/or eliminates the existing problems of conventional incinerating systems for treating waste gas containing VOCs.

SUMMARY OF THE INVENTION

A first objective of the invention is to provide a treatment system for waste gas containing VOCs, wherein the treatment system is operated continuously and economically to achieve high efficiency.

A second objective of the invention is to provide a treatment system for waste gas containing VOCs that have efficient heat utilization.

Other objects, advantages and novel features of the invention will become more apparent from the following detailed description when taken in conjunction with the accompanying drawings.

DETAILED DESCRIPTION OF THE PREFERRED EMBODIMENT

Figure 1:
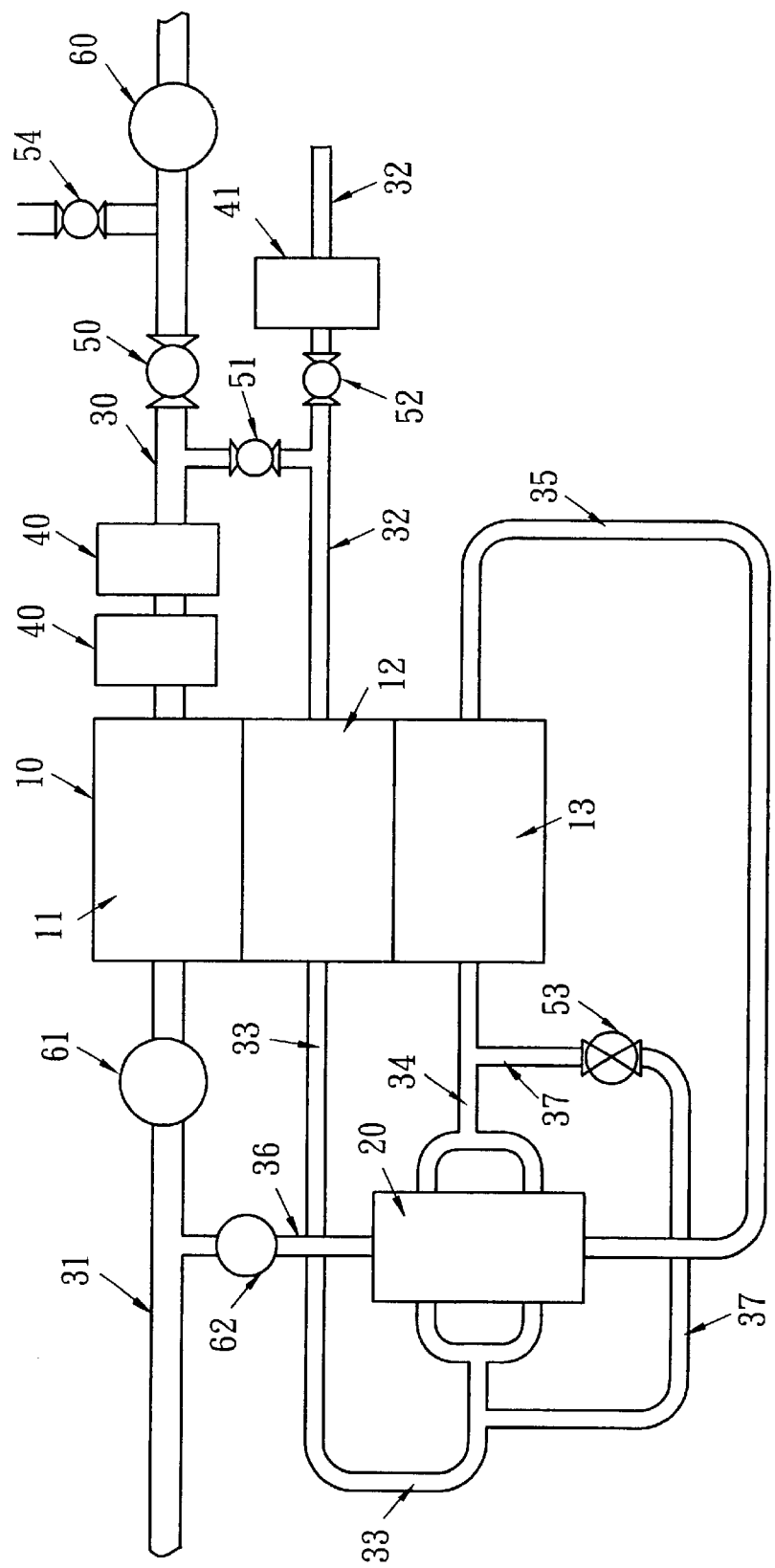
FIG. 1 is a schematic diagram of an embodiment of a treatment system for waste gas containing VOCs according to the present invention.
Figure 3:
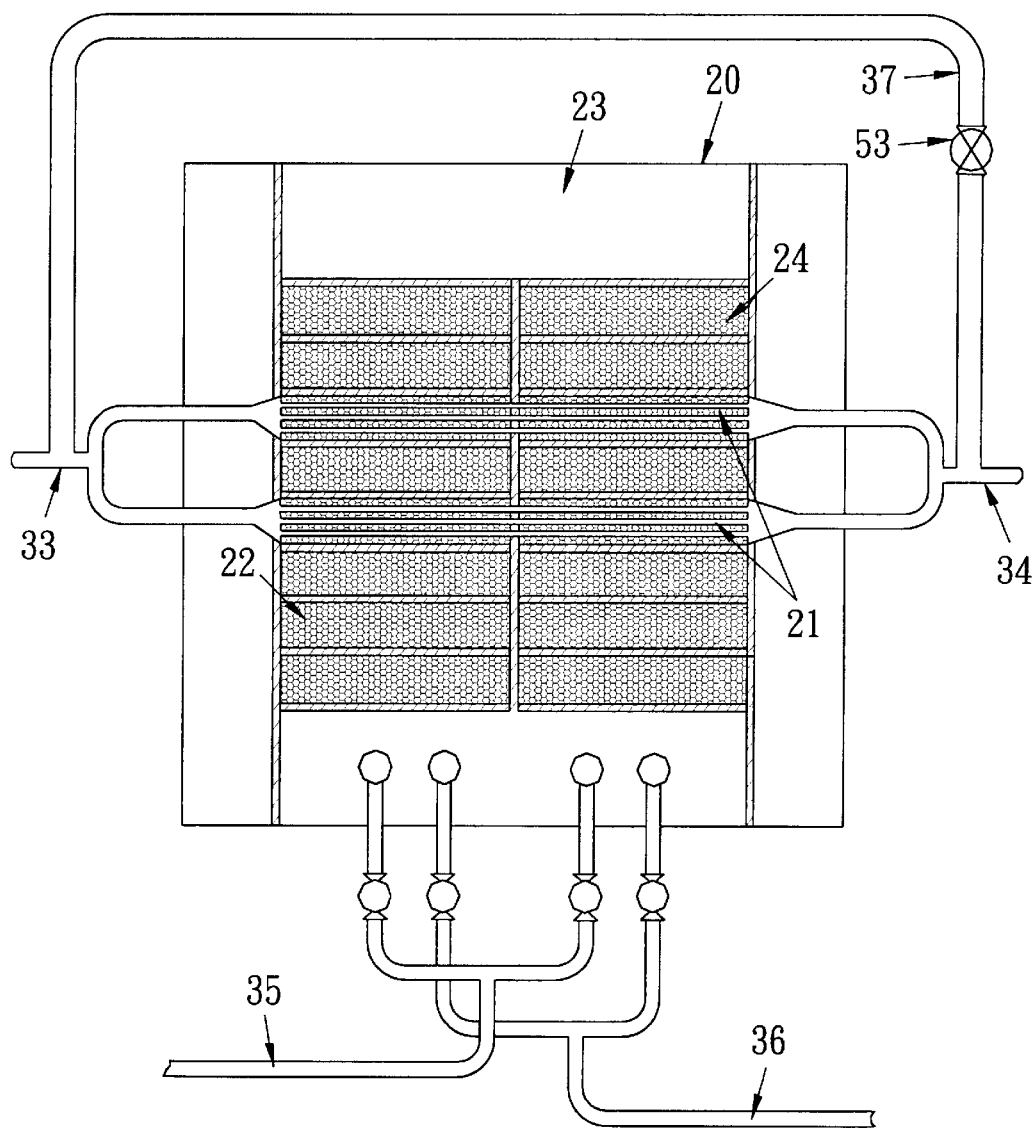
FIG. 3 is a side view in partial section of an incinerator having regenerative heat recovery in the treatment system according to the present invention.

With reference to FIGS. 1 and 3, a treatment system for waste gas containing VOCs is composed of a zeolite revolver (10), an incinerator (20), multiple connecting pipes and multiple exhaust valves.

The zeolite revolver (10) has an absorption zone (11), a purge zone (12) and a desorption zone (13) through which zeolite is continuously cycled. The zeolite in the zeolite revolver (10) absorbs VOCs in the absorption zone (11), desorbs the VOCs in the desorption zone (13) and is cooled in the purge zone (12) before being sent to the absorption zone (11) to be reused again. The absorption zone (11) has two sides (not numbered). A gas supply pipe (30) is connected to one side, and a discharge pipe (31) is connected to the other side. A discharge fan (61) is mounted in the discharge pipe (31) to move gas from the absorption zone (11) to a chimney (not shown). A gas supply valve (50), a gas supply fan (60) and at least one gas supply filter (40) are mounted in the gas supply pipe (30). A gas return valve (54) is connected to the gas supply pipe (30). The purge zone (12) also has two sides (not numbered). A purge supply pipe (32) is connected to one side of the purge zone (12), and a purge supply valve (52) and a purge air filter (41) are mounted in the purge supply pipe (32). A crossover pipe (not numbered) is connected between the gas supply pipe (30) and the purge supply pipe (32) downstream from the gas supply valve (50) and the purge supply valve (52). A purge cross connect valve (51) is mounted in the crossover pipe. A purge discharge pipe (33) is connected between the other side of the purge zone (12) and a heat exchanger (21) in the incinerator (20). As shown in FIG. 3, a heat exchanger discharge pipe (34) is connected between the heat exchanger (21) in the incinerator (20) and the desorption zone (13). A hot gas pipe (35) is connected between the desorption zone (13) and a gas inlet of the incinerator (20). A gas discharge pipe (36) protrudes from the incinerator (20) to connect to the discharge pipe (31) to provide to the chimney. A gas discharge fan (62) is mounted in the gas discharge pipe (36).

The incinerator (20) includes a regenerative heat recovery bed (22), a heat exchanger (21) embedded inside the regenerative heat recovery bed (22), a combustion area (24) above the regenerative heat recovery bed (22) and a heating area (23) near one end of the incinerator (20).

Figure 2:
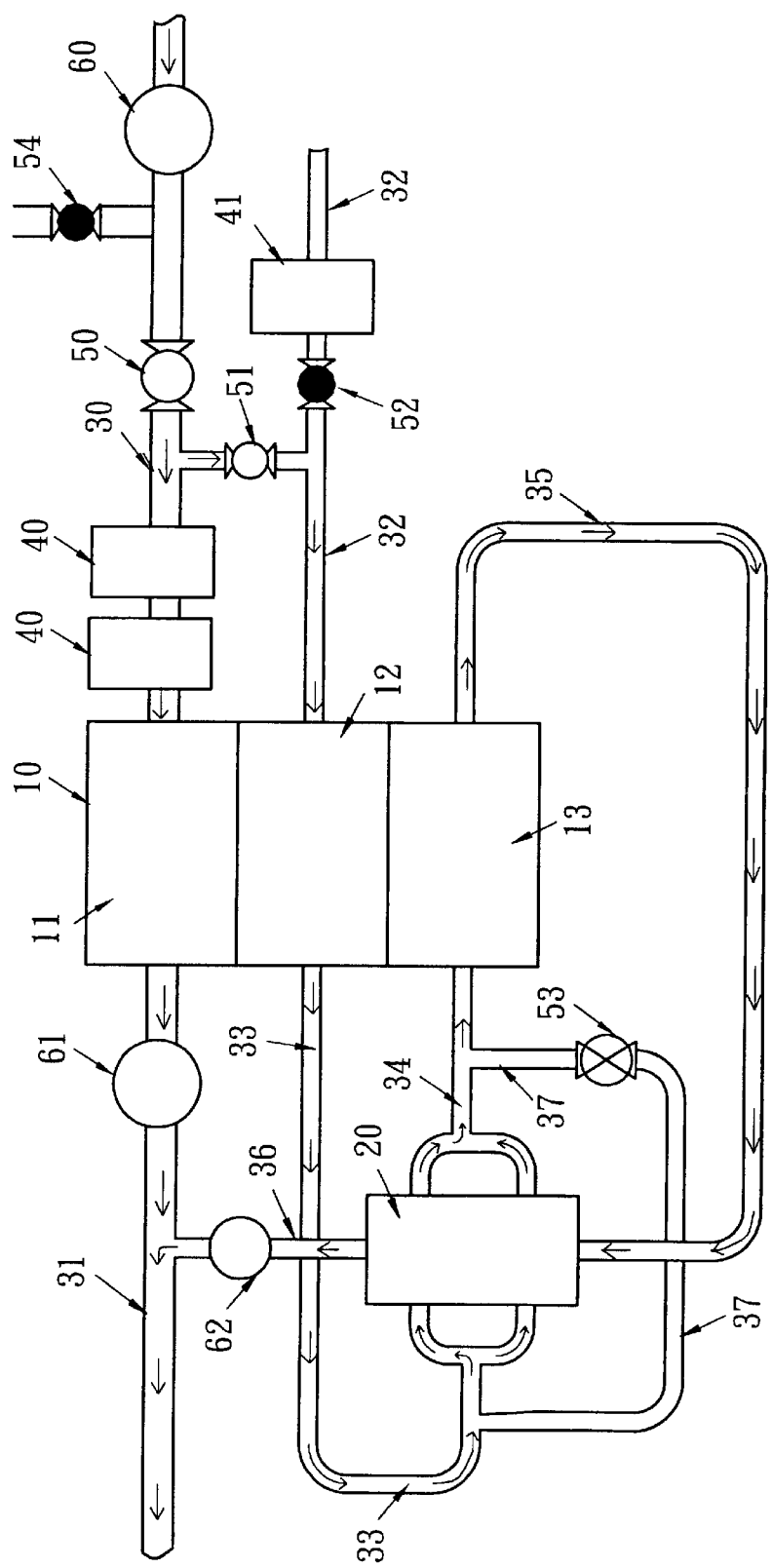
FIG. 2 is a schematic flow diagram for the treatment system in FIG. 1.

With reference to FIG. 2, when the treatment system for waste gas containing VOCs operates, the gas return valve

Figure 4:
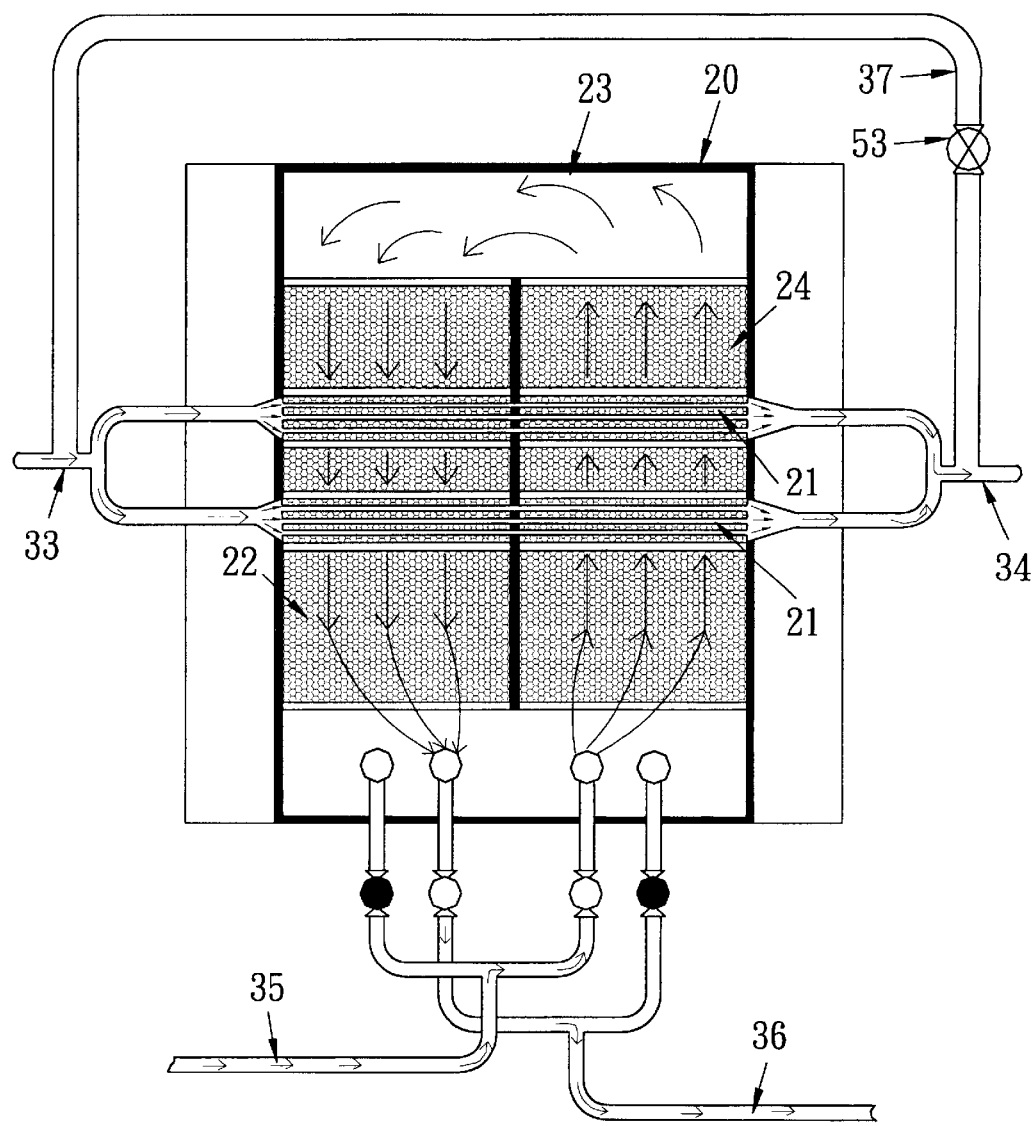
FIG. 4 is an operational side plan view of the incinerator in FIG. 3.

(54) and the purge supply valve (52) are closed and untreated waste gas is drawn into the treatment system through the gas supply pipe (30). The at least one gas supply filter (40) filters the waste gas to remove suspended liquid and solid particles to keep the suspended liquid and solid particles from damaging to the zeolite revolver (10) and the incinerator (20). The gas supply valve (50) is used to regulate the flow of the untreated waste gas, and the purge cross connect valve (51) is used to regulate how much waste gas is drawn into the purge supply pipe (32) via the crossover pipe. For example, the gas supply fan (60) supplies untreated waste gas at 388.7 Nm$^3$/min with 300 ppm of VOCs at 22° C. The discharge fan (61) draws treated waste gas at 362.8 Nm$^3$/min from the absorption zone (11) of the zeolite revolver (10), wherein the concentration of the VOCs is less than 30 ppm (i.e. 90% of the VOCs of the untreated waste gas is removed). Then, the treated gas is drawn out of the system and discharged through the chimney. The gas discharge fan (62) draws 25.9 Nm$^3$/min (about 7%) of the untreated waste gas through the purge zone (12) of the zeolite revolver (10) to cool down desorbed zeolite from the desorption zone (13). The untreated waste gas heated up to 90~140° C. in the purge zone (12) is drawn through the heat exchanger (21) in the incinerator (20) via the purge discharge pipe (33) where it is further heated to 180~200° C. The 180~200° C. untreated waste gas is then drawn into the desorption zone (13) of the zeolite revolver (10) through the heat exchanger discharge pipe (34) to desorb VOCs from the saturated zeolite. A heat exchanger bypass pipe (37) is connected between the purge discharge pipe (33) and the heat exchanger discharge pipe (34). A temperature regulating valve (53) is mounted in the heat exchanger bypass pipe (37) to maintain the waste gas in the desorption zone (13) at 180~200° C. The VOCs concentration of the waste gas discharged from the desorption zone (13) is raised to 4500 ppm. The concentrated waste gas is drawn into the incinerator (20) through the hot gas pipe (35) and is used as fuel for the incinerator (20). The VOCs in the waste gas are burned away completely in the incinerator (20) as shown in FIG. 4, and the residuum gas after combustion is drawn out through the gas discharge pipe (36).

Figure 5:
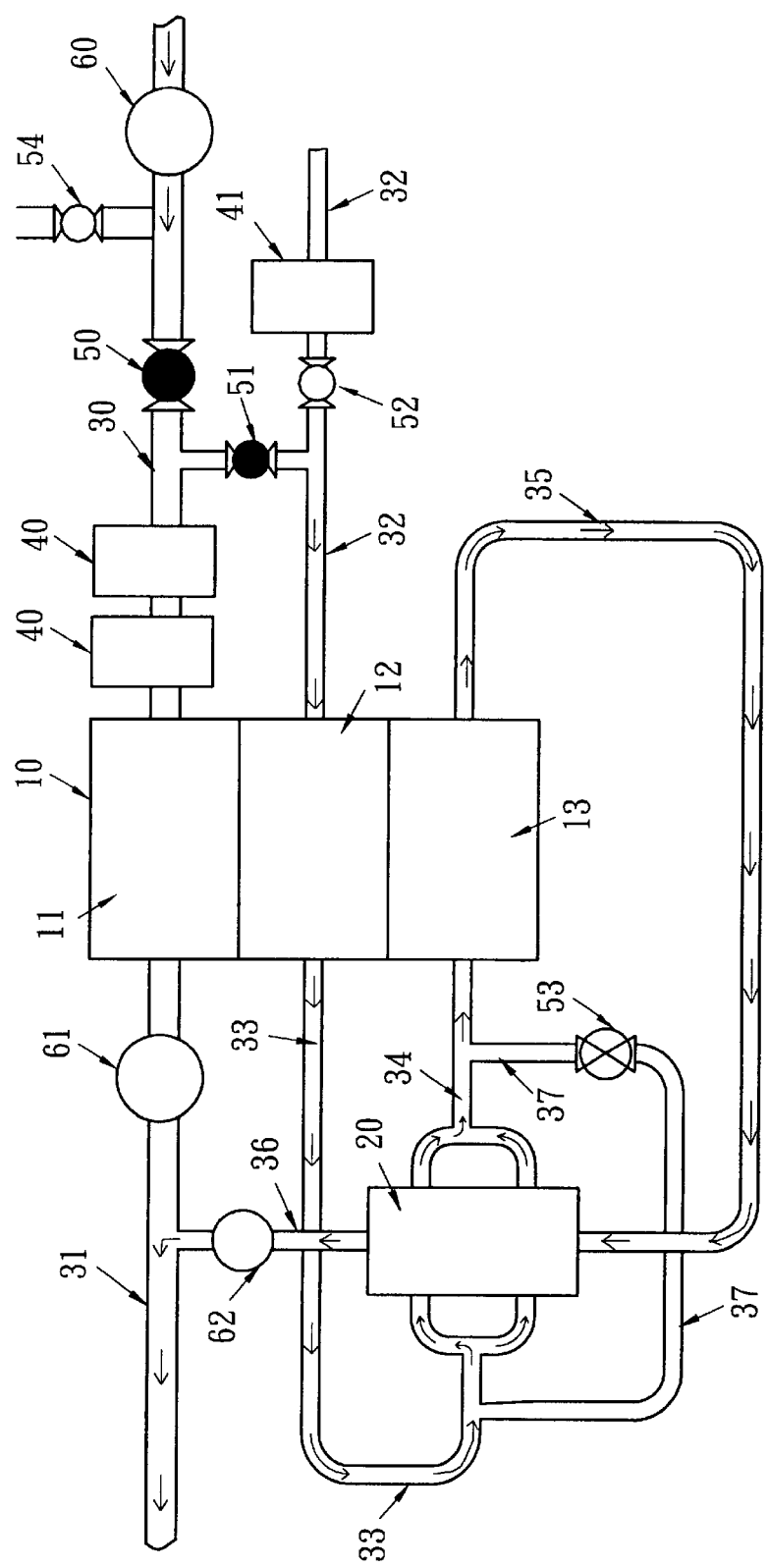
FIG. 5 is a flow diagram of a second embodiment of the operation of the treatment system in accordance with the present invention.

With reference to FIG. 5, the zeolite periodically needs to be regenerated when absorption efficiency of the zeolite revolver (10) reduces. To regenerate the zeolite in the zeolite revolver (10), all gas to the absorption zone (11) is cutoff by closing the gas supply valve (50) and purge cross connect valve (51) and opening the gas return valve (54). The purge supply valve (52) is opened so the gas discharge fan (62) can draw fresh air (not containing VOCs) at 25.9 Nm$^3$/min through the purge supply pipe (32). The fresh air enters the purge zone (12) to cool down the zeolite and subsequently enters the heat exchanger (21) in incinerator (20) through the purge discharge pipe (33). Then, the fresh air heated to 300° C. in the heat exchanger (21) is piped into the desorption zone (13) of the zeolite revolver (10) to desorb VOCs from the zeolite. The heat exchanger bypass pipe (37) and the temperature regulating valve (53) is used to maintain the fresh air at 300° C. The fresh air that picks up VOCs when passing through the desorption zone (13) is piped into the incinerator (20) to burn away the VOCs in the incinerator (20) When the absorption efficiency of the zeolite has been restored, the gas supply valve (50) and the purge cross connect valve (51) are opened, the gas return valve (54) and the purge supply valve (52) are closed and the temperature regulating valve (53) is set to maintain a temperature in the heat exchanger discharge pipe of 180~200° C.

Figure 6:
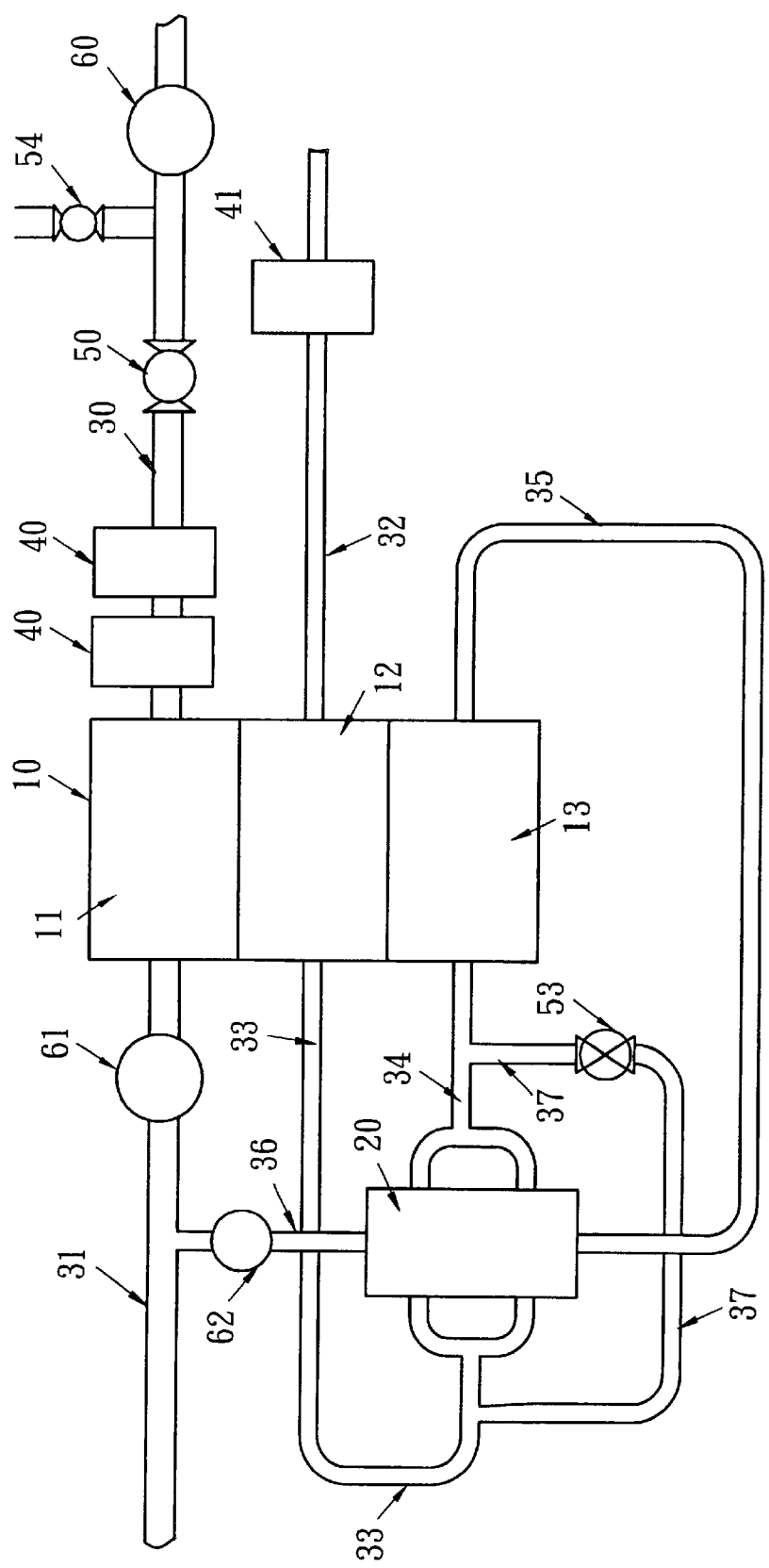
FIG. 6 is a schematic diagram of a second embodiment of the treatment system in accordance with the present invention.

With reference to FIGS. 6 to 10, variations in the piping system and the placement of elements allows for multiple embodiments of the treatment system for waste gas containing VOCs. With reference to FIG. 6, the crossover, purge cross connect valve (51) and purge supply valve (52) are removed from the system to form a second embodiment of the treatment system.

Figure 7:
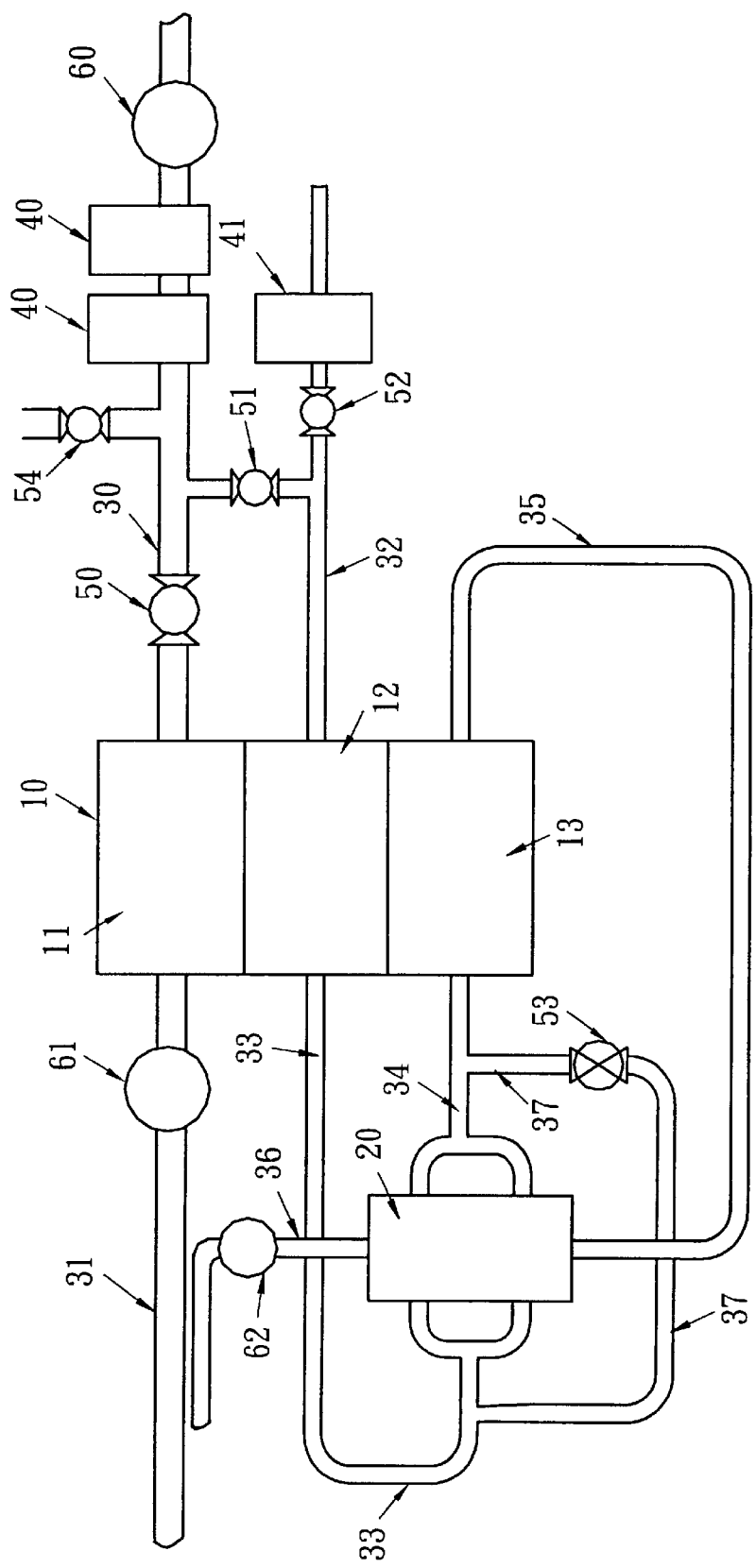
FIG. 7 is a schematic diagram of a third embodiment of the treatment system in accordance with the present invention.

With reference to FIG. 7, a third embodiment of the treatment system has a separate chimney (not shown) connected to the gas discharge pipe (36) rather than connect the gas discharge pipe (36) to the discharge pipe (31). The gas supply filters (40) and the gas supply valve (50) have been rearranged. The gas supply filters (40) are mounted in the gas supply pipe (30) upstream from the gas return valve (54), and the gas supply valve (50) is mounted in the gas supply pipe (30) downstream from the cross connect pipe.

Figure 8:
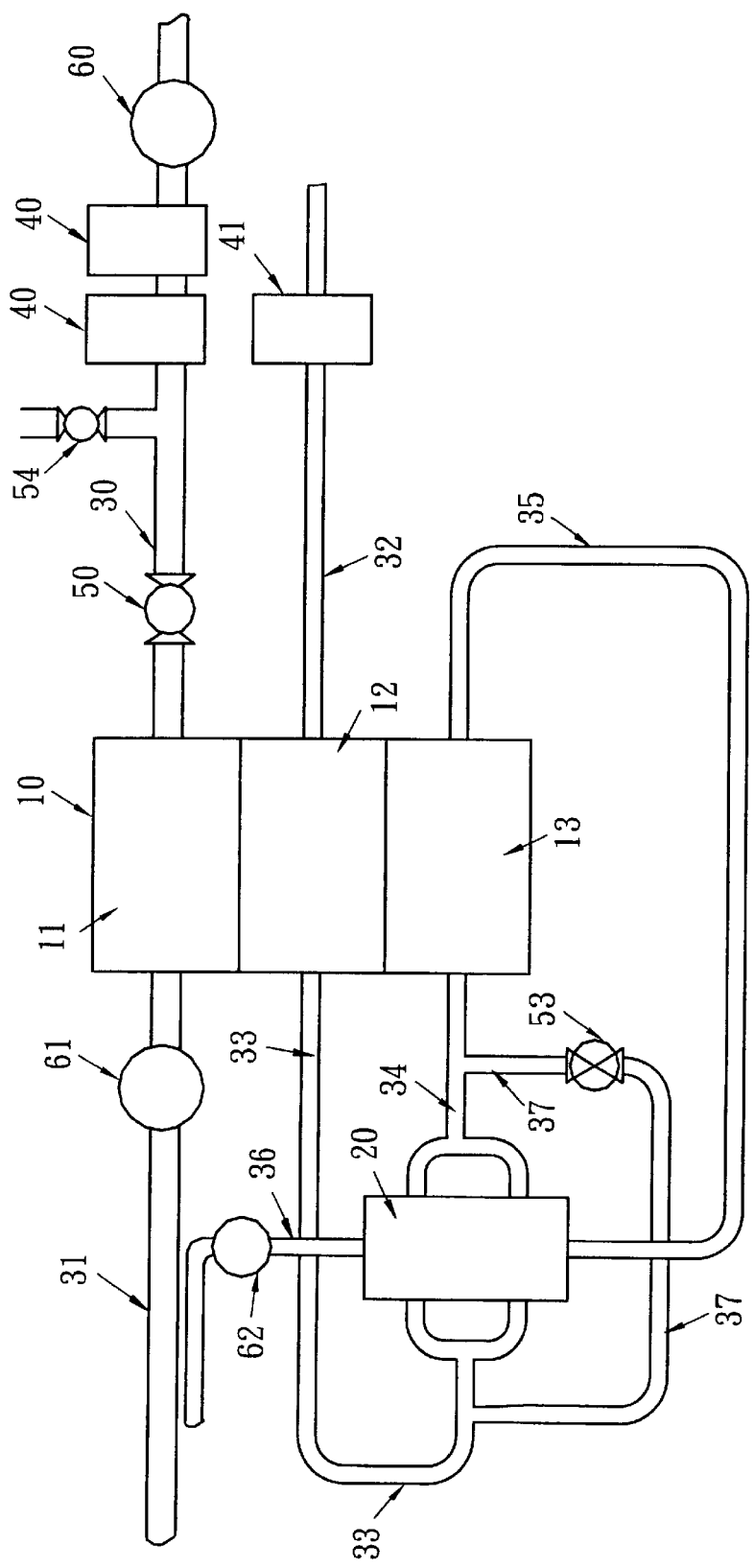
FIG. 8 is a schematic diagram of a fourth embodiment of the treatment system in accordance with the present invention.

With reference to FIG. 8, a fourth embodiment of the treatment system is fundamentally the same as the third embodiment except the cross connect pipe, purge cross connect valve (51) and purge supply valve (52) are removed from the system.

Figure 9:
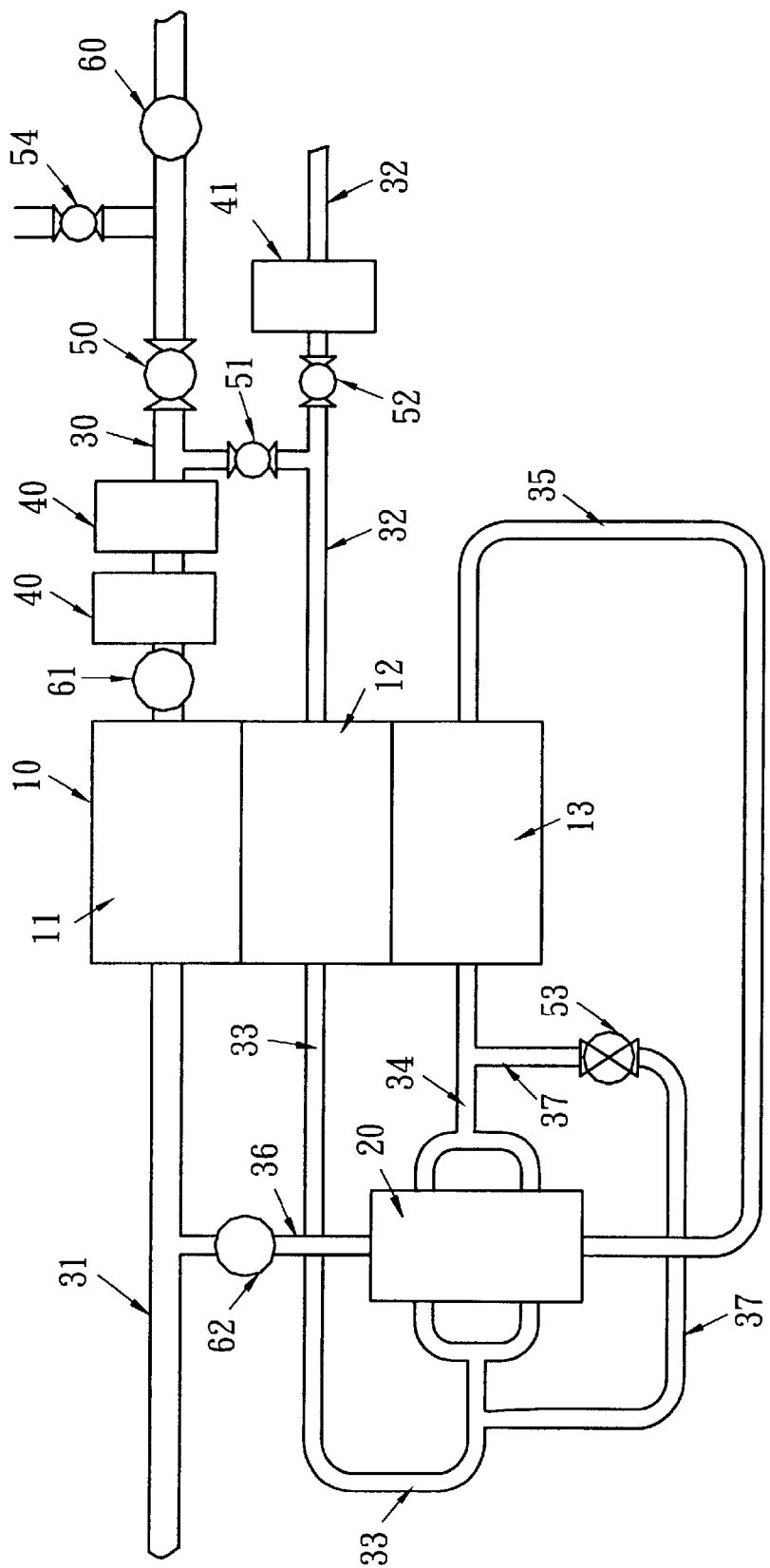
FIG. 9 is a schematic diagram of a fifth embodiment of the treatment system in accordance with the present invention.

With reference to FIG. 9, a fifth embodiment of the treatment system is fundamentally the same as the original embodiment except the discharge fan (61) is mounted in the gas supply pipe (30) in front of the absorption zone (11). A variation of this embodiment would simply remove the discharge fan (61) from the system.

Figure 10:
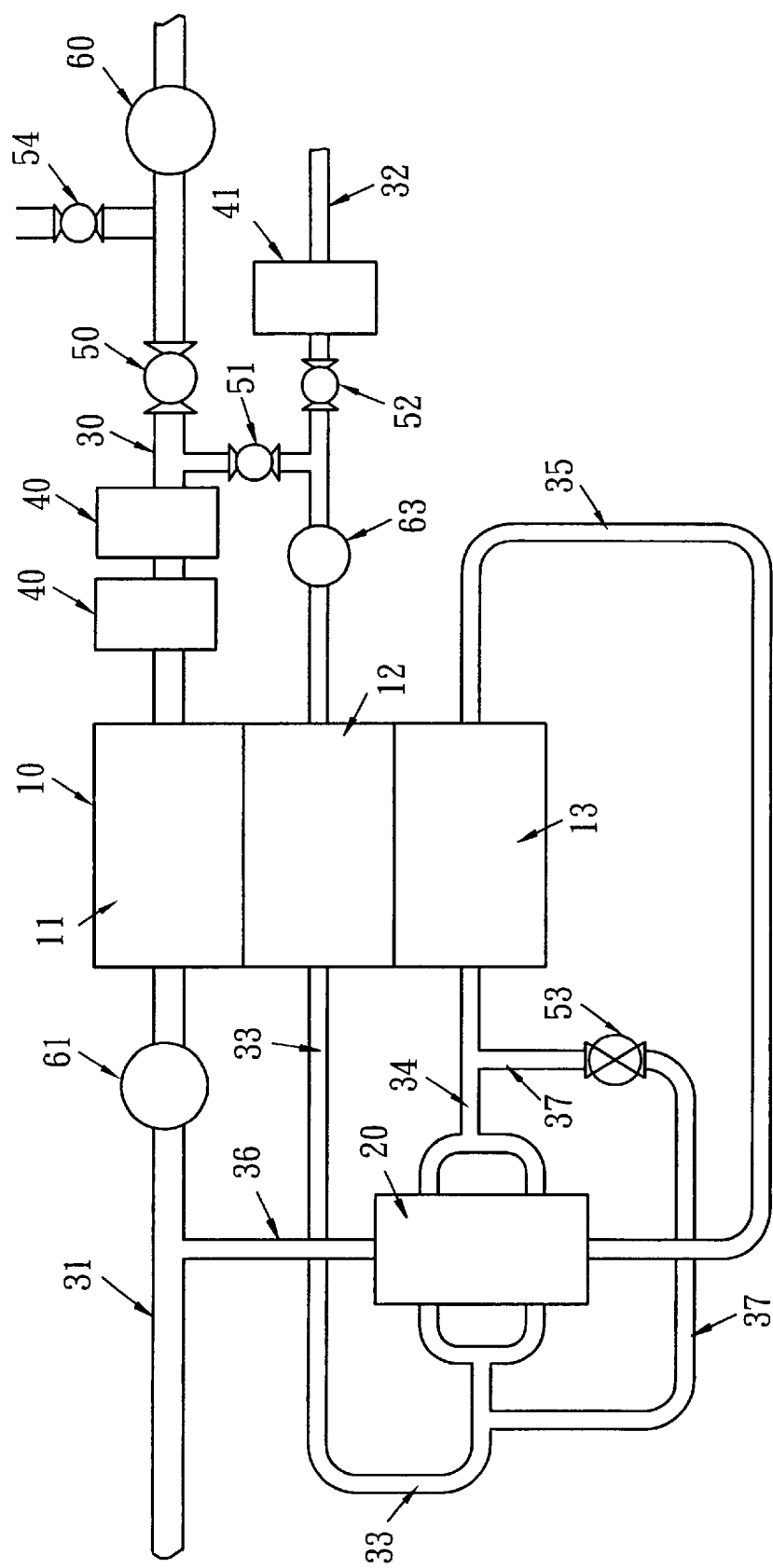
FIG. 10 is a schematic diagram of a sixth embodiment of the treatment system in accordance with the present invention.

With reference to FIG. 10, a sixth embodiment of the treatment system is fundamentally the same as the original embodiment except a purge supply fan (63) is mounted in the purge supply pipe (32) between the cross connect pipe and the purge zone (12) in the zeolite revolver (10) and the gas discharge fan (62) is removed from the gas discharge pipe. A variation of this embodiment would simply remove the gas discharge fan (62) from the original embodiment of the system.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A treatment system for waste gas containing VOCs, the treatment system comprising a zeolite revolver (10), an incinerator (20) and a network of pipes, valves and filters;

the zeolite revolver (10) having an absorption zone (11), a purge zone (12) and a desorption zone (13);

the incinerator (20) connecting to the zeolite revolver (10) by the network of pipes and having a regenerative heat recovery bed (22) and a heat exchanger (21); and the network of the pipes comprising:

a gas supply pipe (30) connecting to the absorption zone (11) of the zeolite revolver (10) to pipe untreated waste gas containing VOCs into the zeolite revolver (10), wherein at least one gas supply filter (40) are mounted on the gas supply pipe;

a discharge pipe (31) connecting between the absorption zone (11) and a chimney with a gas supply fan (60) mounted in the discharge pipe (31);

a purge supply pipe (32) connecting to the purge zone (12) of the zeolite revolver (10) to pipe untreated waste gas into the zeolite revolver (10) with at least one purge air filter (41) mounted in the purge supply pipe (32);

a purge discharge pipe (33) connecting the purge zone (12) of the zeolite revolver (10) and the heat exchanger (21) in the incinerator (20);

a heat exchanger discharge pipe (34) connecting the desorption zone (13) in the zeolite revolver (10) and the heat exchanger (21) in the incinerator (20);

a hot gas pipe (35) connecting the desorption zone (13) to the incinerator (20) as a fuel inlet of the incinerator (20);

a gas discharge pipe (36) connected to the incinerator (20) to draw out treated waste gas inside the incinerator (20); and a heat exchanger bypass pipe (37) connecting the purge discharge pipe (33) and the heat exchanger discharge pipe (34) and having a temperature regulating valve (53) mounted in the heat exchanger bypass pipe (37).

2. The treatment system for waste gas containing VOCs as claimed in claim 1, wherein a gas supply valve (50) are mounted in the gas supply pipe (30), and a gas return valve (54) is connected to the gas supply pipe (30) to release pressure of the treatment system.

3. The treatment system for waste gas containing VOCs as claimed in claim 2, wherein the purge supply pipe (32) pipes fresh air to the purge zone (12) instead of untreated waste gas; and the gas discharge pipe (36) is connected to the discharge pipe (31) and has a gas discharge fan (62) mounted in the gas discharge pipe (36).

4. The treatment system for waste gas containing VOCs as claimed in claim 3, wherein the gas supply pipe (30) further has a discharge fan (61) mounted the gas supply pipe (30).

5. The treatment system for waste gas containing VOCs as claimed in claim 3, wherein the purge supply pipe (32) further has a purge supply fan (63) mounted the purge supply pipe (32).

6. The treatment system for waste gas containing VOCs as claimed in claim 2, wherein a cross connect pipe connects the gas supply pipe (30) and the purge supply pipe (32) with a purge cross connect valve (51) mounted in the cross connect pipe, and the purge supply pipe (32) further has a purge supply valve (52).

7. The treatment system for waste gas containing VOCs as claimed in claim 2, wherein the gas discharge pipe (36) connects the incinerator (20) to a separate chimney.

8. The treatment system for waste gas containing VOCs as claimed in claim 2, wherein the gas supply pipe (30) further has a discharge fan (61) mounted the gas supply pipe (30).

9. The treatment system for waste gas containing VOCs as claimed in claim 2, wherein the purge supply pipe (32) further has a purge supply fan (63) mounted the purge supply pipe (32).

10. The treatment system for waste gas containing VOCs as claimed in claim 1, wherein the purge supply pipe (32) pipes fresh air to the purge zone (12) instead of untreated waste gas; and the gas discharge pipe (36) is connected to the discharge pipe (31) and has a gas discharge fan (62) mounted in the gas discharge pipe (36).

11. The treatment system for waste gas containing VOCs as claimed in claim 10, wherein a cross connect pipe connects the gas supply pipe (30) and the purge supply pipe (32) with a purge cross connect valve (51) mounted in the cross connect pipe, and the purge supply pipe (32) further has a purge supply valve (52).

12. The treatment system for waste gas containing VOCs as claimed in claim 11, wherein the gas supply pipe (30) further has a discharge fan (61) mounted the gas supply pipe (30).

13. The treatment system for waste gas containing VOCs as claimed in claim 11, wherein the purge supply pipe (32) further has a purge supply fan (63) mounted the purge supply pipe (32).

14. The treatment system for waste gas containing VOCs as claimed in claim 10, wherein the gas discharge pipe (36) connects the incinerator to a separate chimney.

15. The treatment system for waste gas containing VOCs as claimed in claim 14, wherein the gas supply pipe (30) further has a discharge fan (61) mounted the gas supply pipe (30).

16. The treatment system for waste gas containing VOCs as claimed in claim 15, wherein the purge supply pipe (32) further has a purge supply fan (63) mounted the purge supply pipe (32).

17. The treatment system for waste gas containing VOCs as claimed in claim 1, wherein a cross connect pipe connects the gas supply pipe (30) and the purge supply pipe (32) with a purge cross connect valve (51) mounted in the cross connect pipe, and the purge supply pipe (32) further has a purge supply valve (52).

18. The treatment system for waste gas containing VOCs as claimed in claim 1, wherein the gas discharge pipe (36) connects the incinerator (20) to a separate chimney.

19. The treatment system for waste gas containing VOCs as claimed in claim 1, wherein the gas supply pipe (30) further has a discharge fan (61) mounted the gas supply pipe (30).

20. The treatment system for waste gas containing VOCs as claimed in claim 1, wherein the purge supply pipe (32) further has a purge supply fan (63) mounted the purge supply pipe (32).

* * * * *